(No Model.)
D. H. CARPENTER.
GAGE WHEEL.
No. 377,800.                        Patented Feb. 14, 1888.
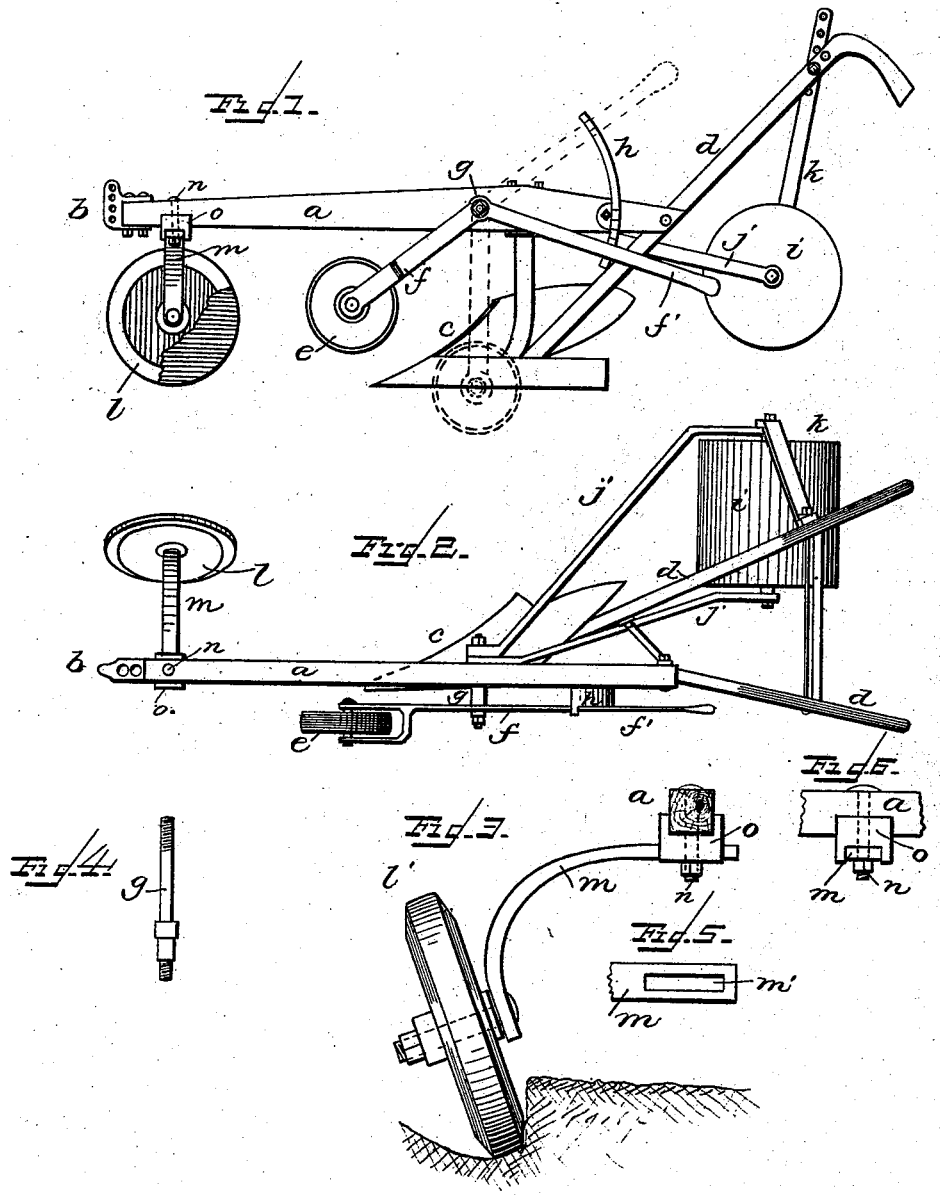
Witnesses.
F. L. Ourand.
Edwin A. Finckel.
Inventor:
Daniel H. Carpenter,
by Wm. A. Finckel,
his Attorney

UNITED STATES PATENT OFFICE.

DANIEL H. CARPENTER, OF ORLANDO, FLORIDA.

GAGE-WHEEL.

SPECIFICATION forming part of Letters Patent No. 377,800, dated February 14, 1888.

Application filed October 26, 1887. Serial No. 253,448. (No model.)

*To all whom it may concern:*

Be it known that I, DANIEL H. CARPENTER, a citizen of the United States, residing at Orlando, in the county of Orange, and State of Florida, have invented a certain new and useful Improvement in Plows, of which the following is a full, clear and exact description.

The object of this invention is to provide attachments for plows which may be readily applied to the plow either by the manufacturer or the farmer himself, and which have in view the utilization of the gage-wheel for a pivot or turning wheel to facilitate the movements of the plow over the surface of the land, and for raising it out of and turning it at the ends of furrows; and also comprehends the provision of a runner or width-gage for aiding in running straight parallel furrows; and also a roller.

I may say at the outset, that I am aware that plows have been provided with truck rollers or wheels arranged within or upon the plow for facilitating the transportation of the plow. Moreover, I am also aware that gage-wheels have been applied to plows and been made vertically adjustable by levers engaging toothed racks, and by various other devices, but such arrangements have been incapable of use for balancing and turning purposes. Furthermore, it is proper here to state that it is quite common to apply to the beam or plow a beveled gage-wheel set at an angle to run in the bottom of the last formed furrow to aid in running straight furrows. And, again, it is old to trail a roller behind a plow to break and smooth the turned over slice of earth. And with this statement, I will now proceed to more particularly point out and claim my invention.

My invention may be stated, in general terms, to consist in, first, a combined gage-wheel and pivot pivoted to one side of the plow beam or standard, and adapted to be thrown up in advance of the share to act as a gage-wheel, and also to be thrown down into a substantially perpendicular plane to assist in raising the plow out of the furrow, and in turning it at the end of the furrow, and also in transporting the plow; and, second, the combination with such gage-wheel of a runner or width-gage, and a roller trailing behind the plow, (the last two arranged on the side of the beam opposite the gage-wheel,) and forming a three-wheel support for the plow.

In the accompanying drawings, in the several figures of which like parts are similarly designated, Figure 1 is a side elevation, and Fig. 2 a plan view, of one form of my invention. Fig. 3 is a cross section of the beam showing the width-gage on a larger scale, and Figs. 4, 5 and 6 details to be referred to.

The beam $a$, clevis $b$, plow $c$, and handles $d$ may be of any approved construction.

The gage-wheel $e$ may be of ordinary form and is mounted to revolve upon one end of the lever $f$, which is pivoted at $g$ to that side of the plow-beam at which is located the land-side of the plow. The lever $f$ is provided with a handle, $f'$, which is constructed in any suitable manner to engage the teeth of a segmental rack-bar $h$ rigidly secured to the side of the beam near the plow handles. The lever $f$ and its handle $f'$ are preferably integral, so that by operating the said handle, the gage-wheel may be thrown into the full-line position shown in Fig. 1, and also into the dotted-line position of the same figure, and any desired position between these two points and held there by the engagement of the said handle with the rack-bar $h$.

It will be observed that the gage-wheel $e$ performs its function as such when arranged in the full-line position shown in Fig. 1. If, now, the said gage-wheel be turned into the position indicated in dotted lines in Fig. 1, it will obviously raise the plow to the height indicated by the excess in distance between the bottom of the plow and the bottom of the tread of said gage-wheel. In other words, the plow will be raised from the ground, and be supported upon the said gage-wheel, and in this position it is obvious that the plow may be trundled upon said gage-wheel and turned in any direction thereupon.

The gage-wheel is pivoted to the beam or standard at such a point that the weight of the plow will be equally distributed on each side of the vertical plane of said pivot, so that when the plow is supported upon the said gage-wheel, it will be balanced, and thus the plowman may readily move the plow in any direction desired. Hence, I refer to the plow herein as being balanced upon its gage-wheel.

The gage-wheel thus constructed may be manufactured separately as an attachment for plows to be applied by the manufacturer, the dealer, or the farmer himself, it being necessary only to pierce the beam transversely to receive the pivot $g$, which may be, for example, a bolt, such as clearly indicated in Fig. 4, and common nuts and washers. The lever $f$ may be made of bar-steel of small dimensions, and itself and its handle shaped by forging.

The length of the lever $f$ from its fulcrum to the journal of the wheel $e$ is such as to bring the journal of said wheel to substantially the level of the lower edge of the landside when the attachment is thrown down into the dotted-line position of Fig. 1, so that, supposing the journal of said gage-wheel to be simply a headed bolt, as shown, the said bolt and landside edge will come in contact, and the strain be taken thus off of the pivot $g$. When the gage-wheel is in the dotted-line position of Fig. 1, and the plow thus in position for being turned, the head of the bolt serves practically as a support on which the landside rests.

The roller $i'$, preferably made of wood, is supported and rotates in a triangular frame, $j$, which is pivoted to the plow beam or standard on the side opposite the gage-wheel so as to rise and fall; and the pivot $g$ may be utilized to receive and secure said frame. An upright arm $k$ extends from the roller to the handles, and may be connected to the handles by a bolt and nut and a series of bolt holes, as shown, so as to provide for the vertical adjustment of the roller.

I do not claim broadly the application of a land roller to a plow, for this is not original with me, as already intimated. My invention in this particular consists in the arrangement of such roller.

The runner or width-gage $l$, for cheapness' and lightness' sake, is preferably made of two or more pieces of board secured together with their grains running in opposite directions, as indicated in Fig. 1. The rim of this wheel $l$ is beveled, and instead of having its beveled edges meet in an angle, I round off the said edges, as shown at $l'$, Fig. 3. This will ease the draft considerably by lessening the friction of the wheel in the earth.

As shown in Figs. 1, 2 and 3 the hanger $m$ of the runner is provided with a slot $m'$, Fig. 5, through which is passed the vertical bolt $n$ adjustably connecting the said hanger and its attached width-gage to the beam $a$. A metal seat $o$ shown in side and end views respectively in Figs. 3 and 6, is preferably interposed between the beam and the hanger, the said seat being recessed at right angles on opposite faces to fit the beam and receive the hanger respectively, the bolt $n$ being passed through said seat, as well as through the beam and hanger.

As in the case of the gage-wheel, and pivot, so also the width-gage and the roller may be made as merchantable attachments to be applied at pleasure.

It will be observed that the width-gage $l$ and the roller, and gage-wheel $e$, being placed upon opposite sides of the plow in a triangular arrangement, will practically subserve the purposes of a wheel-support for the plow, making the plow thus equipped, a wheel-plow, and rendering it self-conforming to the surface of the land. Obviously, the draft will be considerably lightened, as will also the plowman's work, and moreover, the furrows can be plowed much straighter than without such assistance, and practically parallel.

Although I have described the wheel $l$ as composed of two pieces of lumber, I do not thereby restrict my invention to such construction, as it is obvious, a metal wheel may be substituted.

Any suitable colter may be applied to the beam or otherwise connected to the plow.

What I claim is—

1. A lever, $f$, adapted to be pivoted to the plow-beam on the land side of the plow, and provided with a gage-wheel at its lower end, in front of and above the plow-point when used solely as a gage-wheel; and for transportation and turning purposes adapted to be let down below the level of the landside of the plow and to contact therewith and form a rest therefor, and balance the plow, and having a handle and rack, the former within reach of the plowman at the plow-handles for operating said lever and gage-wheel, substantially as described.

2. The combination, with the plow, of a width-gage, and a roller arranged upon one and the same side of the beam, and a depth-gage or pivot wheel arranged upon the other, and constituting a triangular wheel-support for the plow, substantially as described.

In testimony whereof I have hereunto set my hand this 22d day of October, A. D. 1887.

DANIEL H. CARPENTER.

Witnesses:
STEPHEN J. LYON,
SAML. N. CODDING.